United States Patent
Tian et al.

(10) Patent No.: US 7,305,184 B2
(45) Date of Patent: Dec. 4, 2007

(54) METHOD AND SYSTEM FOR MANAGEMENT OF DIRECTLY CONNECTED OPTICAL COMPONENTS

(75) Inventors: Cechan Tian, Plano, TX (US);
Yasuhiko Aoki, Richardson, TX (US);
Susumu Kinoshita, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 687 days.

(21) Appl. No.: 10/615,047

(22) Filed: Jul. 8, 2003

(65) Prior Publication Data

US 2005/0008363 A1 Jan. 13, 2005

(51) Int. Cl.
*H04B 10/08* (2006.01)
*H04B 10/20* (2006.01)
*H04J 14/02* (2006.01)

(52) U.S. Cl. ............................. 398/33; 398/59; 398/82
(58) Field of Classification Search .................... 398/9, 398/17, 25, 33, 82, 59; 370/241.1, 242–246
See application file for complete search history.

(56) References Cited

U.S. PATENT DOCUMENTS

| | | | |
|---|---|---|---|
| 5,915,052 A * | 6/1999 | Ball ............................ | 385/24 |
| 6,160,648 A | 12/2000 | Öberg et al. ................. | 359/110 |
| 6,947,670 B1 * | 9/2005 | Korotky et al. ............... | 398/59 |
| 7,106,969 B1 * | 9/2006 | Lichtman et al. ............. | 398/59 |
| 2003/0108271 A1 * | 6/2003 | Parry et al. ................... | 385/16 |

OTHER PUBLICATIONS

Grenfeldt, "*ERION—Ericsson optical networking using WDM technology*", Ericcson Review No. 3, pp. 132-137, 1998.
Ashmead, "*ROADMap for the Metro Market*", Fiberoptic Product News, pp. 36, 38, and 40, Oct. 2001.
Batchellor, "*Optical Networking the Ericsson Way*", 4 pages, Feb. 22, 2002.

* cited by examiner

*Primary Examiner*—Dalzid Singh
(74) *Attorney, Agent, or Firm*—Baker Botts L.L.P.

(57) ABSTRACT

A method for management of directly connected optical components includes receiving a source optical signal for communication to an optical network. The source optical signal comprises one or more source channels. The method includes monitoring optical traffic communicated on the optical network to determine one or more network channels of the optical traffic and determining network channel information of the one or more network channels. The method also includes communicating to the optical network channels of the one or more source channels that do not interfere with any of the one or more network channels.

14 Claims, 3 Drawing Sheets

METHOD AND SYSTEM FOR MANAGEMENT OF DIRECTLY CONNECTED OPTICAL COMPONENTS

TECHNICAL FIELD OF THE INVENTION

This invention relates generally to the field of optical communication systems and, more particularly, to a method and system for management of directly connected optical components.

BACKGROUND OF THE INVENTION

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of transmitting the signals over long distances with very low loss.

Optical networks often employ wavelength division multiplexing (WDM) or dense wavelength division multiplexing (DWDM) to increase transmission capacity. In WDM and DWDM networks, a number of optical channels are carried in each fiber at disparate wavelengths. Network capacity is based on the number of wavelengths, or channels, in each fiber and the bandwidth, or size of the channels.

The topology in which WDM and DWDM networks are built plays a key role in determining the extent to which such networks are utilized. Ring topologies are common in today's networks. WDM add/drop units serve as network elements on the periphery of such optical rings. By using WDM add/drop equipment at each network element (node), the entire composite signal can be fully demultiplexed into its constituent channels and switched (added/dropped or passed through). Such add/drop equipment can be used to drop traffic off an optical ring to one or more clients associated with the add/drop equipment. In addition, add/drop equipment can be used to communicate traffic from one optical ring to another optical ring. When communicating, or adding, optical signals from one optical component to another, such as from one component to a network, interference may arise between the optical signals being added and the optical traffic already being communicated on the network.

SUMMARY OF THE INVENTION

The present invention provides a method and system for management of directly connected optical components that substantially eliminates or reduces at least some of the disadvantages and problems associated with previous methods and systems.

In accordance with a particular embodiment of the present invention, a method for management of directly connected optical components includes receiving a source optical signal for communication to an optical network. The source optical signal comprises one or more source channels. The method includes monitoring optical traffic communicated on the optical network to determine one or more network channels of the optical traffic and determining network channel information of the one or more network channels. The method also includes communicating to the optical network channels of the one or more source channels that do not interfere with any of the one or more network channels.

The method may include blocking from communication to the optical network any of the one or more source channels that interfere with any of the one or more network channels. This may comprise controlling one or more filters to block from communication to the optical network any of the one or more source channels that interfere with any of the one or more network channels. The method may also include determining source channel information of the one or more source channels at a channel monitor and determining from the network channel information and the source channel information if any of the one or more source channels interferes with any of the one or more network channels. The source channel information of the one or more source channels may comprise identification of wavelengths associated with the one or more source channels. Additionally, the method may include controlling one or more optical switches to communicate each of the one or more source channels to either the channel monitor or to the optical network.

In accordance with another embodiment, a system for management of directly connected optical components includes an in-service monitor coupled to an optical network. The in-service monitor is operable to monitor optical traffic communicated on the optical network. The optical traffic comprises one or more network channels. The in-service monitor is also operable to determine network channel information of the one or more network channels and communicate the network channel information to a network control coupled to the in-service monitor. The system includes a channel monitor coupled to the network control. The channel monitor is operable to receive one or more source channels of a source optical signal, determine source channel information of the one or more source channels and communicate the source channel information to the network control. The network control is operable to determine from the network channel information and the source channel information if any of the one or more source channels interferes with any of the one or more network channels and communicate to the optical network channels of the one or more source channels that do not interfere with any of the one or more network channels.

The system may include one or more optical switches. Each optical switch may be operable to receive a respective channel of the one or more source channels and switchably communicate the respective channel to either the channel monitor or the optical network. The network control may be further operable to control the one or more optical switches to communicate to the optical network channels of the one or more source channels that do not interfere with any of the one or more network channels.

Technical advantages of particular embodiments of the present invention include a manner for communicating an optical signal to a network from a directly connected source without creating interference caused by channels of the optical signal and channels already being communicated on the network. Accordingly, both in-service protection and interconnected channel flexibility may be maintained and therefore low-cost, dynamic subnetwork interconnection may be realized.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments of the invention and their advantages, reference is now made to the following descriptions, taken in conjunction with the accompanying drawings, in which.

DETAILED DESCRIPTION OF THE INVENTION

Figure 1:
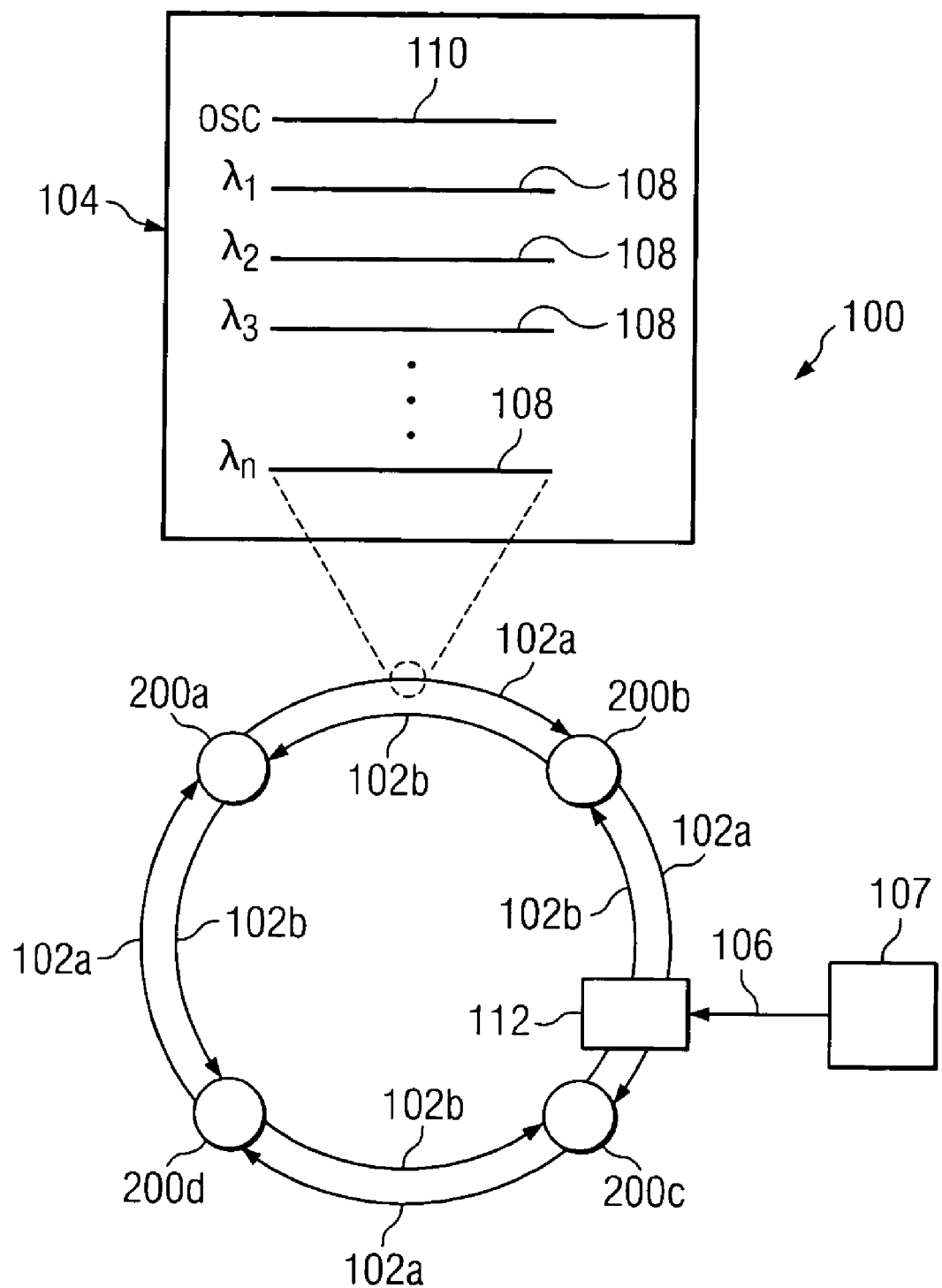
FIG. 1 illustrates an optical communication network with network nodes, in accordance with a particular embodiment of the present invention.

FIG. 1 shows an optical network 100 that may be used to communicate information between network nodes 200 using optical links 102. Optical network 100 generally represents any collection of hardware and/or software that communicates information between network nodes 200 in the form of optical signals. In a particular embodiment, optical network 100 uses wavelength division multiplexing (WDM) or dense wavelength division multiplexing (DWDM) to communicate information on multiple channels, each channel using a different wavelength. Network nodes 200, referring generally to nodes 200a, 200b, 200c and 200d, represent any hardware and/or software that receives information carried in optical network 100 in the form of optical signals, processes that information in any suitable fashion, and/or communicates information to optical network 100. Nodes 200 may include optical switches, amplifiers, add-drop multiplexers, optical-electronic converters, or any other suitable hardware and/or software for processing optical signals.

Links 102 between network nodes 200 represent any suitable links for communicating optical signals 104 between network nodes 200. As such, links 102 may include any manner of optical communication medium, including optical fibers such as single-mode fiber, dispersion compensation fiber, dispersion-shifted fiber, non-zero dispersion shifted fiber. Links 102 may also include any other suitable optical components, such as amplifiers, repeaters, or optical-electronic-optical (OEO) converters. Links 102 may carry information using any suitable format or protocol, including frame relay, asynchronous transfer mode (ATM), synchronous optical network (SONET), or any other suitable method of communication. Links 102 may also perform any necessary signal and/or protocol conversion necessary to communicate information between nodes 200. Links 102 may be unidirectional or bidirectional. In many networks, there is an "eastbound" path traveling clockwise around optical network 100, and a "westbound" path, which communicates information counterclockwise around optical network 100. Each link 102 may include one or multiple optical fibers or other media for communicating optical signals 104, and nodes 200 of optical network 100 may be arranged in any suitable configuration, including rings, stars, or other suitable network configuration.

In a particular embodiment, links 102 carry optical signals 104 that have a wavelength spectrum of the form shown in FIG. 1. Signal 104 may comprise several different data channels. Each channel has an associated wavelength in which data in the channel is communicated. Information carried on link 102 may be assigned to any particular wavelength 108 and optical signal 104. Using appropriate equipment, wavelengths 108 may be added, dropped, switched, or otherwise processed separately. Signal 104 also includes an optical supervisory channel (OSC) 110 that represents one or more wavelengths assigned to carry information used for management of network 100. For example, OSC 110 may communicate status information for the channels 108 indicating whether each channel 108 is provisioned and whether there has been an error detected in communications in the channel 108. Any number of wavelengths may be assigned to OSC 110 for carrying network management information.

In a particular embodiment, an optical signal 106 from a source 107 is added to optical network 100 at an optical link, for example optical link 102b. Optical signal 106 is added to optical network 100 using direct connection with source 107. Direct connection of source 107 with network 100 allows for the communication of signal 106 from the source to the network without requiring a transponder. Source 107 may comprise another optical network, subnetwork, ring, node, client or any other component that communicates optical signals. Optical signal 106, like optical signal 104, carries optical information in several different wavelengths.

The adding of optical signal 106 to optical network 100 may ordinarily cause difficulties such as interference, for example, if information of optical signal 106 to be added to optical network 100 is carried in one or more wavelengths already being communicated on optical network 100 at the point at which signal 106 is added. Thus, optical link 102b includes a direct connection node 112 to prevent the addition of particular wavelengths which are already being communicated on optical network 100 at optical link 102b. Direct connection node 112 monitors both optical signal 106 to be added to optical network 100 and the optical signals currently communicated on optical network 100, such as optical signal 104, to prevent interference caused by the addition of wavelengths already being communicated on the network. Direct connection node 112 may include any suitable hardware, software, element or object operable to facilitate these or additional operations in accordance with particular needs.

Figure 2:
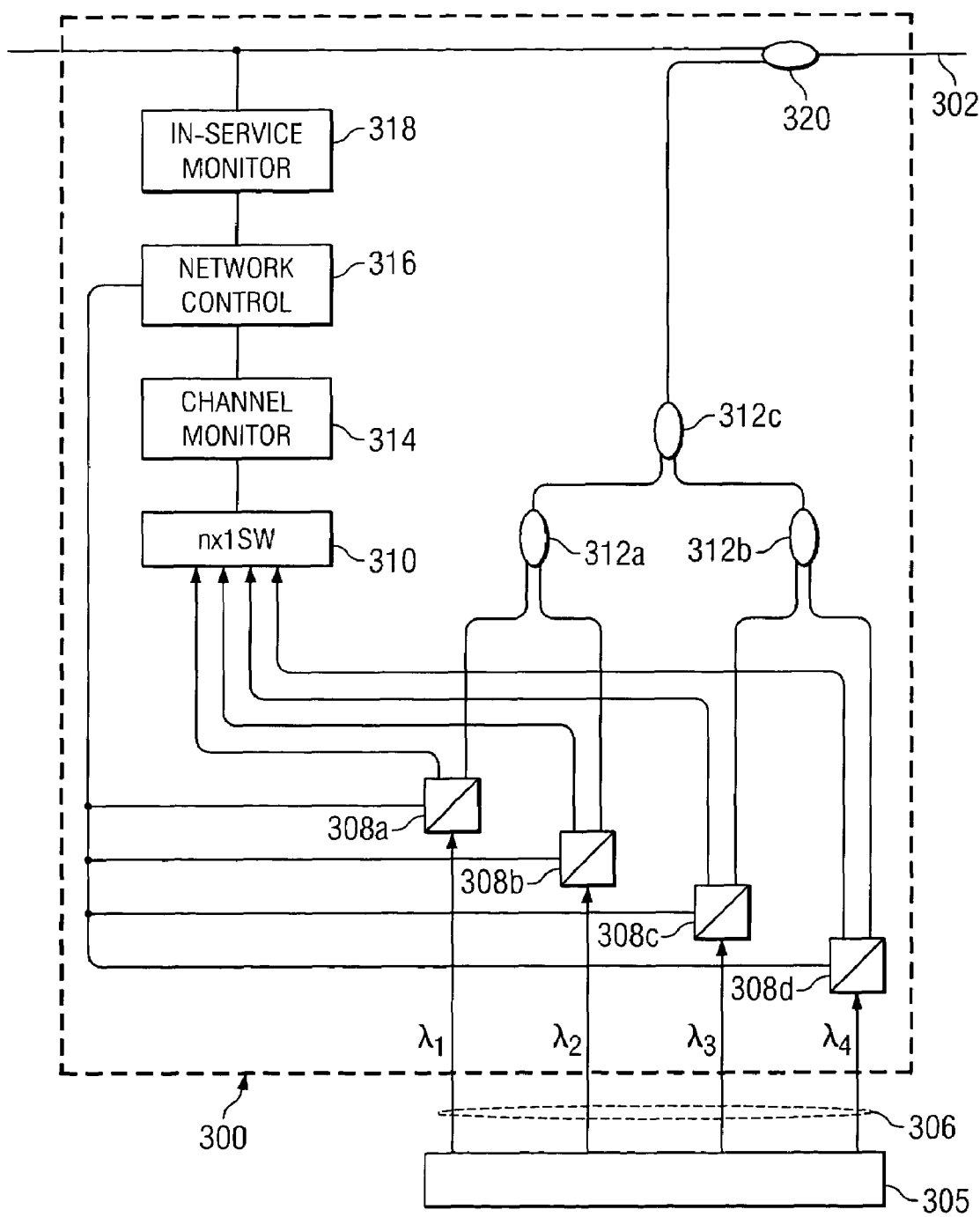
FIG. 2 illustrates a direct connection node utilizing a channel monitor, in accordance with an embodiment of the present invention.

FIG. 2 illustrates a direct connection node 300 utilizing a channel monitor, in accordance with an embodiment of the present invention. In particular embodiments, the configuration of direct connection node 300 may be used for direct connection node 112 of FIG. 1. Direct connection node 300 is coupled to optical link 302 of an optical network. Direct connection node 300 provides a manner for direct connection of a source 305 with optical link 302 that reduces interference that may be caused by the addition of optical channels 306 of optical traffic to the optical network of link 302. Source 305 may comprise an optical network, subnetwork, ring, node, client or any other component that communicates optical signals.

Optical channels 306 to be added to optical link 302 enter direct connection node 300 from source 305. In the illustrated embodiment, optical channels 306 comprise four channels ($\lambda_1$, $\lambda_2$, $\lambda_3$ and $\lambda_4$) of optical traffic; however other embodiments may include any other number of optical channels for addition to an optical link at a direct connection node. Each channel enters a respective 1×2 switch 308. Each 1×2 switch 308 may send its received optical channel to either n×1 switch 310 or a series of combiners 312 which combine received channels for addition to optical link 302 at combiner 320. For the purposes of this description and the following claims, the terms "coupler," "splitter" and "combiner" should each be understood to include any device which receives one or more input optical signals and either splits or combines the input optical signal(s) into one or more output optical signals. Other embodiments may include another number of combiners 312 for combining the received channels for addition to an optical link.

Channel monitor 314 receives the channels transmitted to n×1 switch 310 and transmits to network control 316 the identification of such channels. In-service monitor 318 monitors optical link 302 to determine which channels are being communicated on link 302. In-service monitor 318 transmits such information to network control 316. Channel monitor 314 and in-service monitor 318 may perform an optical-electrical-optical conversion in order to determine the channels that are received at direct connection node 300 and communicated on optical link 302, respectively. Network control 316 receives channel information from both in-service monitor 318 and channel monitor 314. Based on such information, network control 316 controls switches 308 to only allow channels not being communicated on optical link 302 to pass through the switches, therefore avoiding the creation of interference caused by the addition of new information carried in such channels to optical link 302. For example, if $\lambda_1$ channel is presently being communicated on optical link 302, then network control 316 will not allow switch 308a to send the $\lambda_1$ traffic it receives to combiners 312 for addition to optical link 302. Monitors 314 and 318 may include components such as a photo detector or optical spectrum analyzer, and network control 316 may include components such as a network management system. Monitors 314 and 318 and network control 316 may also include any other suitable hardware, software, element or object operable to facilitate the operations performed by such components as described herein.

The use of n×1 switch 310 to receive each channel 306 of optical traffic enables a single channel monitor to be used to monitor the channels, thereby avoiding the additional costs of using a separate channel monitor for each channel 306 of optical traffic. Because one channel monitor is used, network control 316 may serially check each channel received at n×1 switch 310. If network control 316 determines that adding a particular channel would not create interference on optical link 302, then the channel's switch 308 may be switched to transmit the channel to combiners 312. In particular embodiments, network control 316 only checks the traffic received at the direct connection node when provisioning or reconfiguration occurs with respect to source 305 or traffic being communicated on optical link 302.

Figure 3:
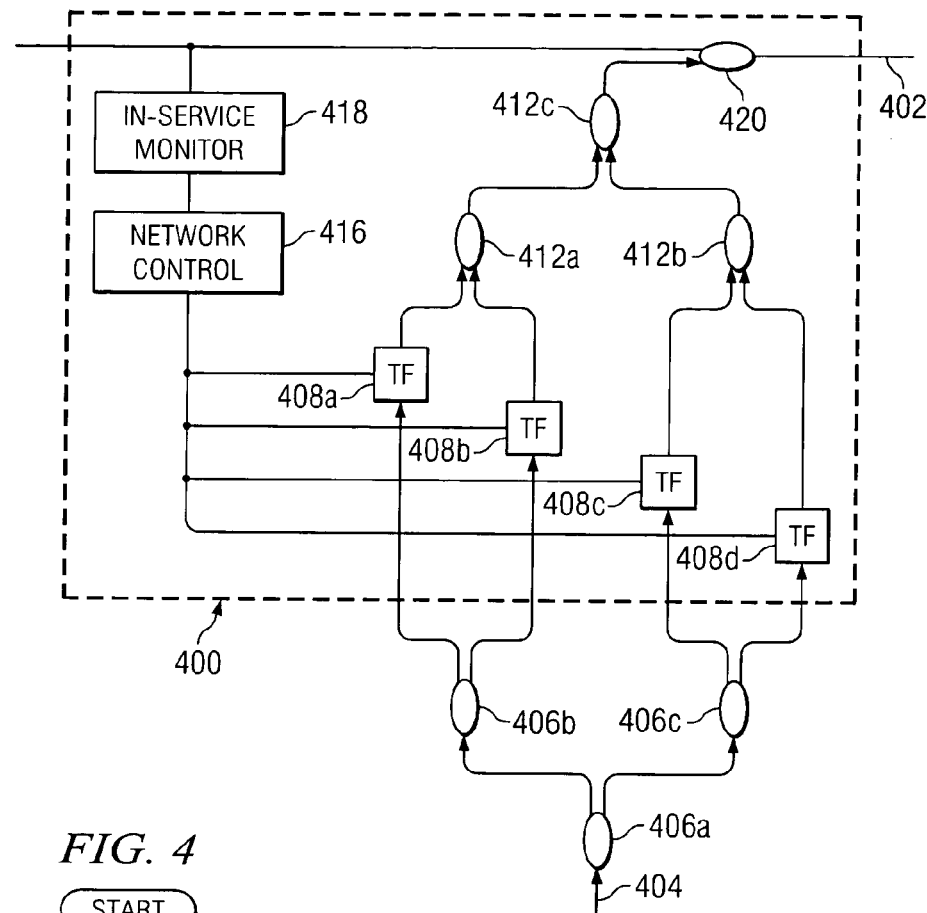
FIG. 3 illustrates a direct connection node utilizing tunable filters, in accordance with an embodiment of the present invention.

FIG. 3 illustrates a direct connection node 400 utilizing tunable filters, in accordance with an embodiment of the present invention. In particular embodiments, the configuration of direct connection node 400 may be used for direct connection node 112 of FIG. 1. Direct connection node 400 is coupled to optical link 402 of an optical network. Direct connection node 400 provides a manner for direct interconnection of a source 405 with optical link 402 that reduces interference that would be caused by the addition of particular channels of an optical signal 404 to the optical network of link 402. Source 405 may comprise an optical network, subnetwork, ring, node, client or any other component that communicates optical signals.

Optical signal 404 to be added to optical link 402 passes through a series of couplers 406 which produce four copies of the optical signal. Although couplers 406 are described, any other suitable optical splitters may be used. Moreover, while three couplers 406 are illustrated, other embodiments may include any other number of couplers to produce one or more copies of optical signal 404.

Each copy of the optical signal is forwarded to a respective tunable filter 408 of direct connection node 400. Tunable filters 408 may each be configured to allow respective channels of traffic to pass through. As an example, if optical signal 404 includes n number of channels ($\lambda_1, \lambda_2, \lambda_3 \ldots \lambda_n$), then tunable filters 408a-408d may block all traffic except for channels $\lambda_1$-$\lambda_4$, respectively. While four tunable filters 408 are illustrated, other embodiments may include any other number of tunable or other filters to block any number of respective channels of traffic from passing through.

Network control 416 controls each tunable filter 408 to determine the channels of optical signal 408 that are allowed to pass through each filter. In-service monitor 418 monitors optical link 402 to determine which channels are being communicated on link 402 and transmits such information to network control 416. Thus, network control 416 receives the information relating to the channels being communicated on link 402 and controls tunable filters 408 to only allow channels not being communicated on optical link 402 to pass through the filters. Therefore, the creation of interference caused by the addition to optical link 402 of new information carried in channels currently being communicated on optical link 402 is avoided.

After the optical signals have passed through tunable filters 408 where one or more channels have been blocked, the signals are combined at combiners 412 for addition to optical link 402 at combiner 420.

Figure 4:
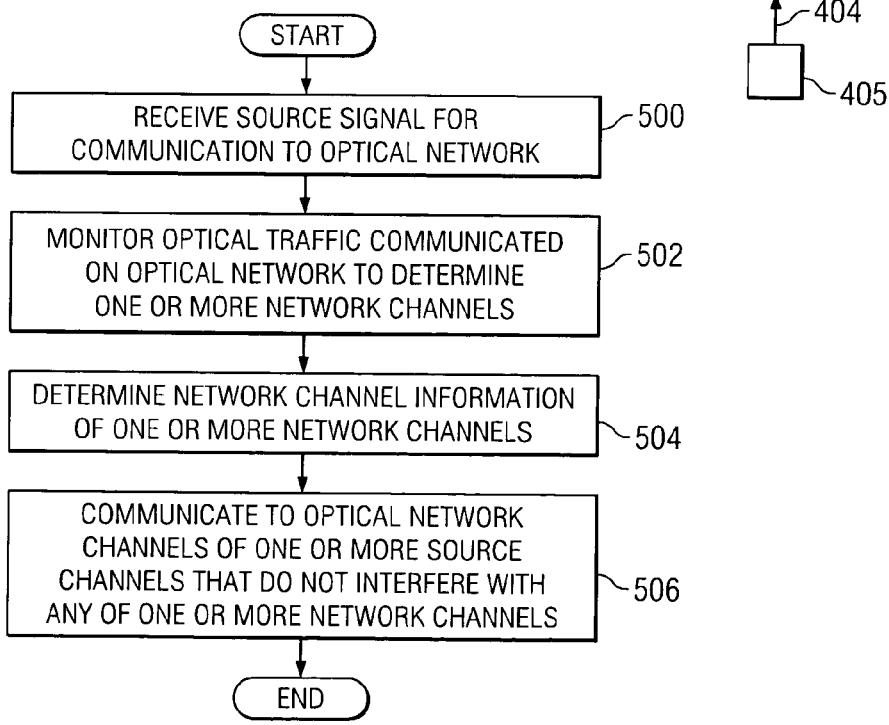
FIG. 4 is a flowchart illustrating a method for management of directly connected optical components, in accordance with an embodiment of the present invention.

FIG. 4 is a flowchart illustrating a method for management of directly connected optical components, in accordance with an embodiment of the present invention. The method begins at step 500 where an optical source signal is received for communication to an optical network. The source signal may be received from an optical network, subnetwork, ring, node, client or any other component that communicates optical signals. At step 502, optical traffic communicated on the optical network is monitored to determine one or more network channels of the optical traffic.

The method proceeds to step 504, where network channel information of the one or more network channels is determined. Such network channel information may include identification of wavelengths associated with the one or more network channels. At step 506, channels of the one or more source channels that do not interfere with any of the one or more network channels are communicated to the optical network. Any of the one or more source channels that interfere with any of the one or more network channels may be blocked from communication to the optical network. Such blocking may include controlling one or more filters that receive the one or more source channels. In particular embodiments, the filters may include tunable filters that may be controlled to block any of the source channels that would interfere with any of the network channels. In some embodiments, switches may be utilized to control the source channels communicated to the optical network.

Although an example method has been described, steps may be modified, added or omitted without departing from the scope of the invention. Additionally, steps may be performed in any suitable order without departing from the scope of the invention.

In particular embodiments, passive optical components may include a memory chip attached to each component that stores component information. Such passive components do not include power, electricity and/or moving parts. They may include optical couplers, optical filters (i.e., single channel or sub-band filters), fixed attenuators, interleavers or other components. The component information stored in the memory chip may include physical information, optical functions or component performance (i.e., loss or bandwidth). For example, a memory chip of a passive WDM channel filter may include information of the passband central wavelength, passband width or the insertion loss of the filter.

The memory chip may also include the ability to allow a management system coupled to the particular optical component to detect the presence of the component. The memory chip will not affect operation of the component to which it is coupled but will simply provide inventory and other information to a network management system. Once a chip is installed for a particular optical component, a network management system may detect the presence of the component and may automatically provide information for the whole network to the component and determine whether the component is correctly installed. Thus, problems with the performance of the component may be avoided. A particular component's information may also be provided to all other memory chips of other optical components within an optical network. Such information may also be updated as it changes. The use of the memory chips described herein in an optical network may additionally save time and reduce mistakes relating to replacement, reconfiguration and upgrade of the network.

Numerous other components other than those illustrated herein may be used in combination with the illustrated elements or substituted for these elements without departing from the teachings of the present invention. Moreover, particular components illustrated herein may be otherwise split or combined as suitable for particular networking needs or physical restrictions and space allocations.

Although the present invention has been described in detail, various changes and modifications may be suggested to one skilled in the art. It is intended that the present invention encompass such changes and modifications as falling within the scope of the appended claims.

What is claimed is:

1. A method for management of directly connected optical components, comprising:
    receiving a source optical signal for communication to an optical network, the source optical signal comprising one or more source channels;
    monitoring optical traffic communicated on the optical network to determine one or more network channels in which the optical traffic is communicated;
    determining network channel information of the one or more network channels;
    communicating, to the optical network, channels of the one or more source channels that do not interfere with any of the one or more network channels and preventing from communication, to the optical network, channels of the one or more source channels that interfere with any of the one or more network channels; and
    wherein the network channel information of the one or more network channels comprises identification of wavelengths associated with the one or more network channels.

2. The method of claim 1, further comprising blocking from communication to the optical network any of the one or more source channels that interfere with any of the one or more network channels.

3. The method of claim 2, wherein blocking from communication to the optical network any of the one or more source channels that interfere with any of the one or more network channels comprises controlling one or more filters to block from communication to the optical network any of the one or more source channels that interfere with any of the one or more network channels.

4. The method of claim 3, wherein controlling one or more filters to block from communication to the optical network any of the one or more source channels that interfere with any of the one or more network channels comprises tuning one or more tunable filters.

5. The method of claim 1, further comprising switching the one or more source channels to a channel monitor to determine source channel information of the one or more source channels.

6. The method of claim 5, further comprising determining from the network channel information and the source channel information whether any of the one or more source channels interferes with any of the one or more network channels.

7. The method of claim 6, further comprising controlling one or more optical switches to communicate to the optical network channels of the one or more source channels that do not interfere with any of the one or more network channels.

8. The method of claim 5, wherein the source channel information of the one or more source channels comprises identification of wavelengths associated with the one or more source channels.

9. A system for management of directly connected optical components, comprising:
    an in-service monitor coupled to an optical network, the in-service monitor operable to:
        monitor optical traffic communicated on the optical network, the optical traffic comprising one or more network channels;
        determine network channel information of the one or more network channels; and
        communicate the network channel information to a network control coupled to the in-service monitor;
    one or more filters coupled to a source and to the network control, each filter operable to:
        receive one or more source channels of a source optical signal; and
        block from communication to the optical network one or more of the received one or more source channels;
    the network control operable to control the one or more filters to block any of the one or more source channels that interfere with any of the one or more network channels; and
    wherein the network channel information of the one or more network channels comprises identification of wavelengths associated with the one or more network channels.

10. The system of claim 9, wherein:
    the one or more filters comprise one or more tunable filters; and
    the network control is operable to tune the one or more tunable filters to block any of the one or more source channels that interfere with any of the one or more network channels.

11. A system for management of directly connected optical components, comprising:
    an in-service monitor coupled to an optical network, the in-service monitor operable to:
        monitor optical traffic communicated on the optical network, the optical traffic comprising one or more network channels;
        determine network channel information of the one or more network channels; and communicate the network channel information to a network control coupled to the in-service monitor;

a channel monitor coupled to the network control, the channel monitor operable to:

receive one or more source channels of a source optical signal;

determine source channel information of the one or more source channels; and communicate the source channel information to the network control; and the network control operable to:

determine from the network channel information and the source channel information if any of the one or more source channels interferes with any of the one or more network channels; and communicate to the optical network channels of the one or more source channels that do not interfere with any of the one or more network channels.

12. The system of claim 11:

further comprising one or more optical switches, each optical switch operable to:

receive a respective channel of the one or more source channels; and switchably communicate the respective channel to either the channel monitor or the optical network; and wherein the network control is operable to control the one or more optical switches to communicate to the optical network channels of the one or more source channels that do not interfere with any of the one or more network channels.

13. The system of claim 11, wherein the source channel information of the one or more source channels comprises identification of wavelengths associated with the one or more source channels.

14. The system of claim 11, wherein the network channel information of the one or more network channels comprises identification of wavelengths associated with the one or more network channels.

* * * * *